(12) United States Patent
Kooker et al.

(10) Patent No.: US 10,569,672 B1
(45) Date of Patent: Feb. 25, 2020

(54) ADAPTIVE TENSILE SURFACE

(71) Applicant: Apple Inc., Cupertino, CA (US)

(72) Inventors: Andrew W. Kooker, San Francisco, CA (US); John J. Baker, Campbell, CA (US); Jonathon Folks, Cupertino, CA (US); James G. Griffin, II, Sunnyvale, CA (US); Jun Wooung Jeong, San Francisco, CA (US); Craig Ogden, Pleasanton, CA (US); Lukas Satas, San Jose, CA (US); Zachary Segraves, Redwood City, CA (US); Ben Walker, Campbell, CA (US); David Yates, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 122 days.

(21) Appl. No.: 15/706,611

(22) Filed: Sep. 15, 2017

Related U.S. Application Data

(60) Provisional application No. 62/396,707, filed on Sep. 19, 2016.

(51) Int. Cl.

| | |
|---|---|
| *B60N 2/22* | (2006.01) |
| *B60N 2/42* | (2006.01) |
| *B60N 2/68* | (2006.01) |
| *B60N 2/20* | (2006.01) |
| *B60N 2/02* | (2006.01) |
| *B60N 2/885* | (2018.01) |
| *B60N 2/56* | (2006.01) |

(52) U.S. Cl.
CPC ............. *B60N 2/22* (2013.01); *B60N 2/0232* (2013.01); *B60N 2/20* (2013.01); *B60N 2/4214* (2013.01); *B60N 2/682* (2013.01); *B60N 2/885* (2018.02); *B60N 2/5685* (2013.01)

(58) Field of Classification Search
CPC ..................... B60N 2/0232; B60N 2002/0236; A47C 7/14; A47C 7/144
See application file for complete search history.

(56) References Cited

U.S. PATENT DOCUMENTS

| | | | | |
|---|---|---|---|---|
| 3,208,794 A | * | 9/1965 | Gunn | A47C 31/11 297/440.11 |
| 3,273,877 A | * | 9/1966 | Geller | B60N 2/72 267/89 |
| 4,712,834 A | * | 12/1987 | Warrick | A47C 7/14 244/122 R |
| 4,858,992 A | * | 8/1989 | LaSota | B60N 2/002 297/284.2 |
| 5,058,952 A | * | 10/1991 | LaSota | A47C 7/28 297/284.2 |

(Continued)

*Primary Examiner* — Gary C Hoge
(74) *Attorney, Agent, or Firm* — Young Basile Hanlon & MacFarlane, P.C.

(57) ABSTRACT

An adaptive tensile control system includes a covering couple to a motorized retractor operable to release and retract the covering in response to control signals. An adaptive seat suspension includes a flexible suspension mat coupled to a motorized retractor operable to release and retract the flexible suspension mat in response to control signals. A method includes adapting the size of a support in a seat and adapting a covering overlying the support. A device includes an inflatable bolster within a seat having a covering. An apparatus includes a seat back and a seat that includes foam having a variable surface and a seamless covering.

20 Claims, 10 Drawing Sheets

(56) References Cited

U.S. PATENT DOCUMENTS

| | | | | |
|---|---|---|---|---|
| 6,384,715 | B1* | 5/2002 | Potter | A47C 7/467 340/407.1 |
| 6,601,919 | B1* | 8/2003 | Deceuninck | B60N 2/6671 297/284.4 |
| 8,210,612 | B2* | 7/2012 | Adams | A47C 7/462 297/284.2 |
| 9,022,474 | B2* | 5/2015 | Bullard | A47C 7/285 297/284.1 |
| 2003/0132658 | A1* | 7/2003 | Gordon | B60N 2/504 297/452.55 |
| 2005/0225156 | A1* | 10/2005 | Stiller | A47C 7/282 297/452.64 |
| 2005/0242652 | A1* | 11/2005 | Kepler | A47C 7/14 297/452.56 |
| 2013/0285426 | A1* | 10/2013 | Arant | B60N 2/62 297/284.1 |
| 2014/0306496 | A1* | 10/2014 | Woodward | B62J 1/10 297/204 |
| 2015/0223608 | A1* | 8/2015 | Capra | A47C 7/22 297/452.18 |
| 2018/0236901 | A1* | 8/2018 | Abe | B60N 2/0284 |

\* cited by examiner

ADAPTIVE TENSILE SURFACE

RELATED APPLICATIONS

This application claims priority from U.S. Provisional Patent Application Ser. No. 62/396,707, filed Sep. 19, 2016, entitled "ADAPTIVE TENSILE SURFACE," which is incorporated herein by reference in its entirety.

FIELD

The present disclosure relates generally to seats and more specifically to vehicle seats.

BACKGROUND

Seats such as automobile seats and office desk chairs are typically equipped with contoured seats. Some car seats provide seat positioning adjustments, lumbar support, or leg support extensions that are selectively engaged by a driver or passenger. Such features offer a more comfortable ride, especially on long trips, or, in the case of desk chairs, a more comfortable work environment.

Over time, the trim (e.g., fabric) that covers the seat contours becomes worn, stretched out, or otherwise fatigued. Trim fatigue is especially problematic for car seats with bolsters because car seats are heavily used and passengers rub against the bolsters when entering and exiting the seat. Furthermore, many car seats include leather trim, which has limited elasticity. Manufacturers often address the issues of trim fatigue dividing seats and seat backs into sections that are covered separately, stitched, or quilted, so as to reduce material strain.

BRIEF SUMMARY

In accordance with some embodiments, an adaptive tensile control system is described. The adaptive tensile control system comprises: a covering over at least a portion of a seat; and a motorized retractor coupled to the covering, the motorized retractor including one or more electric motors operable to: release the covering in response to a first control signal, and retract the covering in response to a second control signal, different from the first control signal.

In accordance with some embodiments, an adaptive seat suspension is described. The adaptive seat suspension comprises: a flexible suspension mat providing support in a seat; and a motorized retractor coupled to the flexible suspension mat, the motorized retractor including one or more electric motors operable to: release the flexible suspension mat in response to a first control signal, and retract the flexible suspension mat in response to a second control signal, different from the first control signal.

In accordance with some embodiments, a method is described, comprising: receiving a control signal to change a size of a support within a seat; adapting the size of the support by changing a support volume based on the control signal; and adapting an amount of a covering overlying the support so as to take up slack in the covering when the support volume decreases, and to release the covering when the support volume increases, the amount of the overlying covering depending on the change in the support volume.

In accordance with some embodiments, a device is described. The device comprises: a seat; an inflatable bolster within the seat, the seat having a covering that covers the inflatable bolster; a spool mounted below the seat; an electric motor coupled to the spool; and a spool sensor configured to: detect a change in spool tension; and transmit a control signal to the electric motor, the control signal causing the electric motor to: rotate the spool in a forward direction so as to automatically wind the covering onto the spool as the spool tension decreases, and counter-rotate the spool in a reverse direction so as to automatically let out the covering from the spool as the spool tension increases.

In accordance with some embodiments, a device is described. The device comprises: a seat; a bolster within the seat, the seat having a covering that covers the bolster; a spool mounted below the seat; an electric motor coupled to the spool; and a switch configured to inflate or deflate the bolster and to transmit a control signal to the electric motor, the control signal causing the electric motor to: rotate the spool in a first direction so as to wind the covering onto the spool as the bolster is deflated; and counter-rotate the spool in a second direction so as to unwind the covering from the spool as the bolster is inflated.

In accordance with some embodiments, a motorized retractor is described. The motorized retractor comprises: first and second spools mechanically coupled to one another by a fabric having a first end wound around the first spool and a second end wound around the second spool; a first electric motor coupled to the first spool; a second electric motor coupled to the second spool; a tension sensor mounted on each of the first spool and the second spool, the tension sensors configured to transmit control signals to the electric motors, the control signals causing the electric motors to: rotate the spools concurrently in opposite directions so as to wind fabric onto the spools when the spool tension sensors detect a decrease in spool tension; and counter-rotate the spools concurrently in opposite directions so as to release fabric from the spools when the spool tension sensors detects an increase in spool tension.

In accordance with some embodiments, an apparatus is described. The apparatus comprises: a seat back; and a seat mounted adjacent to the seat back, the seat including foam having a variable surface and a seamless covering.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

Although the following description uses terms such as "first" and "second" to describe various elements, these elements should not be limited by the terms. These terms are only used to distinguish one element from another. For example, a first control signal could be termed a second control signal, and, similarly, a second control signal could be termed a first control signal, without departing from the scope of the various embodiments described herein. The first control signal and the second control signal are both control signals, but they are not the same control signal.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

Figure 1:
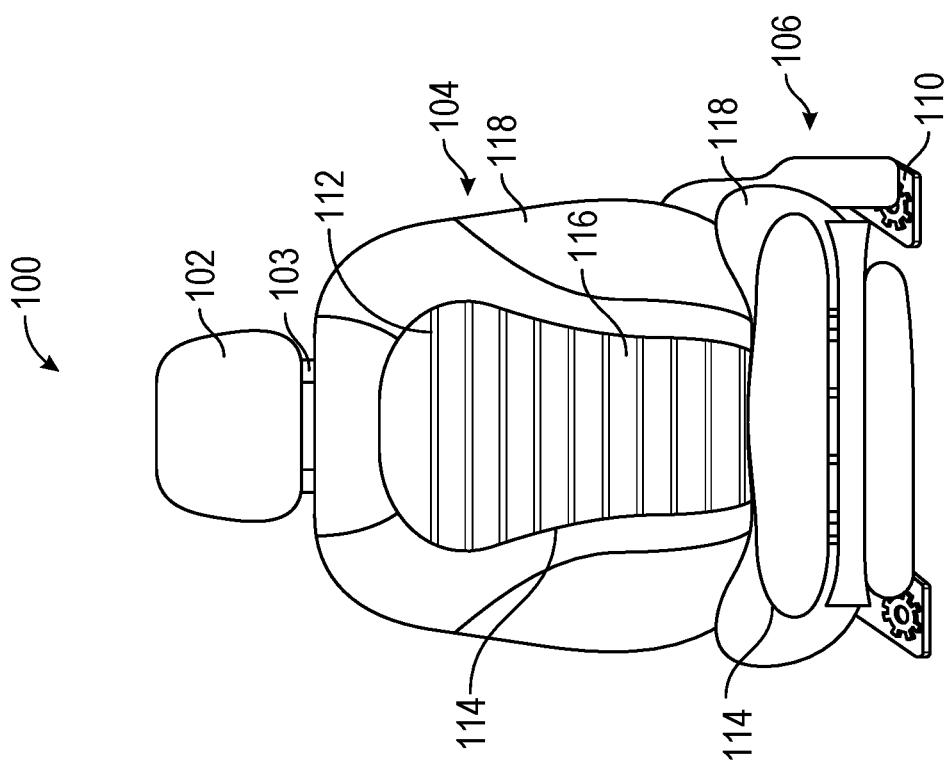
FIG. 1 is a front pictorial view of a conventional vehicle seat assembly.

Turning now to the figures, FIG. 1 shows a conventional vehicle seat assembly 100. Basic parts of the vehicle seat assembly 100 include a headrest 102, headrest posts 103, a seat back 104, a seat 106, and a seat track 110. The headrest posts 103 attach the headrest 102 to the seat back 104. The seat 106 slides forward and backward along the seat track 110, together with the seat back 104. The seat back 104 and the seat 106 include padding and a covering over the padding. Conventional padding for vehicle seats typically supports a human body using convex pillowing 116 and bolsters 118. The pillowing 116 and bolsters 118 are covered with a trim material having associated seams 114 joined by stitching (e.g., 112). Commonly used trim materials include a velour textile, leather, and vinyl. Various contours, indentations, divisions, and seams of the conventional vehicle seat 100 tend to create a lumpy, unattractive surface that is difficult to clean and maintain. Vehicle seats that include such elements deform over time and tend to show wear. In particular, bolsters 118 tend to show wear resulting from passenger ingress and egress.

Figure 2:
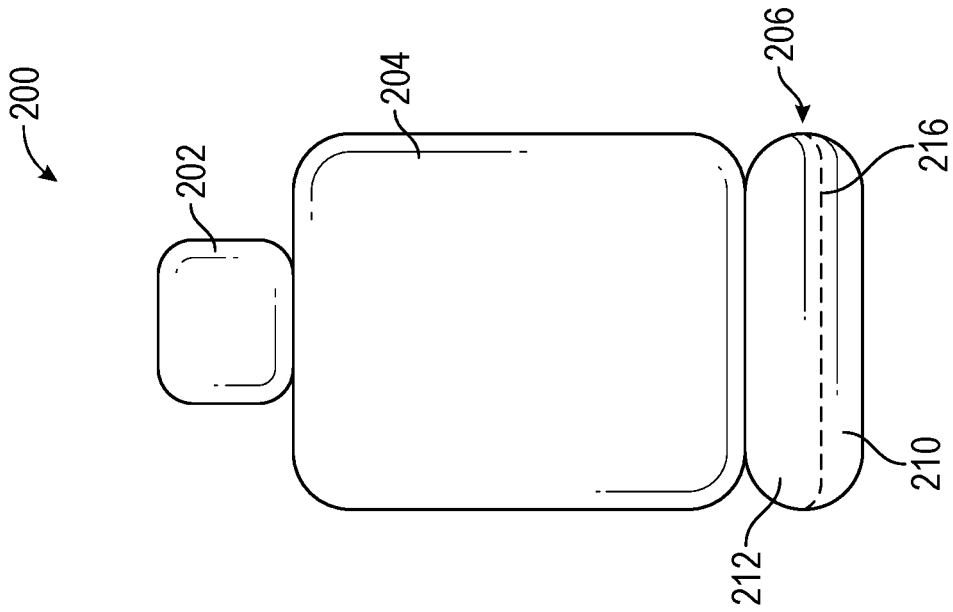
FIG. 2 is a front pictorial view of a seat assembly that includes contoured foam and conformal trim, according to some embodiments of the present disclosure as described herein.

FIG. 2 illustrates a vehicle seat assembly 200, according to some embodiments of the present disclosure. The vehicle seat assembly 200 features a design having fewer permanent, built-in surface features. The vehicle seat assembly 200 includes a headrest 202, a seat back 204, and a seat 206, for which several variations 206a, 206b, and 206c are described below. Elements of seats 206a, 206b, and 206c can be combined and/or omitted. The vehicle seat assembly 200 also optionally includes an active suspension 208 (e.g., contained within the seat). The seat 206 has a lower portion 210, an upper portion 212, and a midline 216 located on a vertical surface of the seat 206.

In some embodiments, the upper portion 212 of the seat 206 includes foam, such as countered foam, covered with a single, continuous, seamless trim material that conforms to the contoured foam. The seat back 204 also optionally includes contoured foam and a conformal, seamless trim material. The trim material used in the vehicle seat assembly 200 retains strong definition and lends a smooth, sleek, and streamlined appearance to the vehicle interior. Cushioning for the vehicle seat assembly 200 is internal to the seat and is hidden rather than being formed in various surfaces protruding from the seat back 204 and the seat 206. Consequently, the vehicle seat assembly 200 is easier to maintain than the conventional vehicle seat 100. Furthermore, entering and exiting the vehicle is facilitated because occupants are able to slide into and out of the seats with less resistance. To achieve a continuous geometry surface, trim is attached to the contoured foam using various techniques as described below. Some techniques described herein fix the trim (or portions of the trim) to the contoured foam to present a static, spatially pre-adapted appearance while other techniques allow for slip between the trim and the contoured foam, in a dynamically adaptive fashion.

Figure 3:
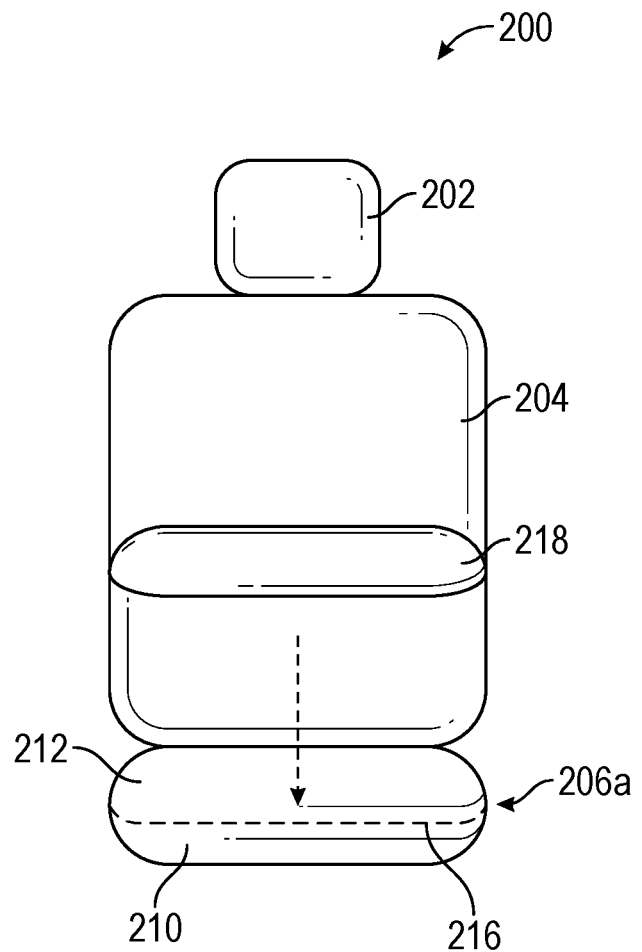
FIG. 3 is a front pictorial view of a seat having a covering that is installed as a single formed trim unit, according to some embodiments of the present disclosure as described herein.

FIG. 3 shows the vehicle seat assembly 200 equipped with a unitary seat 206a, according to some embodiments of the present disclosure. In some examples, trim material on the unitary seat 206a is installed as a single, pre-formed trim unit 218. In some examples, the trim unit 218 is formed separately from the upper portion 212, and then the trim unit 218 is bonded to the upper portion 212 to form the unitary seat 206a. In some examples, the trim unit 218 is formed separately from the upper portion 212 and/or the lower portion 210, and then the trim unit 218 is bonded to the upper portion 212 and at least part of the lower portion 210 to form the unitary seat 206a. In such examples, the trim unit 218 is manufactured to fit at least the upper portion 212 of the unitary seat 206a to within a precise tolerance. A flexible trim unit 218 conforms to the upper portion 212 and, optionally, to the lower portion 210.

In some embodiments, the trim unit 218 is formed as an integral part of the unitary seat 206a, thereby preventing trim material from stretching or pulling away from contours in the padding of the seat. Trim materials are selected so as to allow particular areas to conform to the seat geometry. For example, memory foam is shaped to fit a particular design while the trim unit 218 is also formed to fit the same design.

In some embodiments, the trim unit 218 and the foam of the unitary seat 206a are manufactured together to a desired shape. For example, a thin, rigid mold is formed, over which trim material is stretched or shaped by compression to form the trim unit 218. Additionally or alternatively, the trim material includes thermo-plastic elements that melt and then bond to one another in the shape of the mold. In some embodiments, a foam-in-place process is used to form padding for the unitary seat 206*a*, using the same, or a similar, mold. Foam is poured into the mold and, optionally, expands to fit the interior surface of the mold while the trim material is shaped by the exterior surface of the mold. In some examples, the foam-in-place process includes one or more temperature-varying process steps to lock in the shape of the mold to both the foam and the trim. In some examples, the mold is removed, while in other examples, the mold is retained as part or all of the trim unit 218. In some examples, trim unit 218 is secured to the molded foam of the unitary seat 206*a* using, for example, one or more adhesives (e.g., a spray adhesive, a foam adhesive, a thermal adhesive film) and/or a hook-and-loop closure, such as Velcro™. In some embodiments, the foam itself contains an adhesive that is, for example, heat-activated. In some examples, only part of the upper portion 212 is adhered to the trim unit 218. When the padding and the covering are formed together in this way, they will conform to one another. Consequently, the trim material will follow contours of the foam instead of pulling flat relative to the foam contours. In some embodiments, trim materials are selected to allow particular areas to deform to foam geometry. In some embodiments, the trim material and foam are formed together to a desired shape and secured using a film adhesive and/or hook-and-loop closures.

Figure 4:
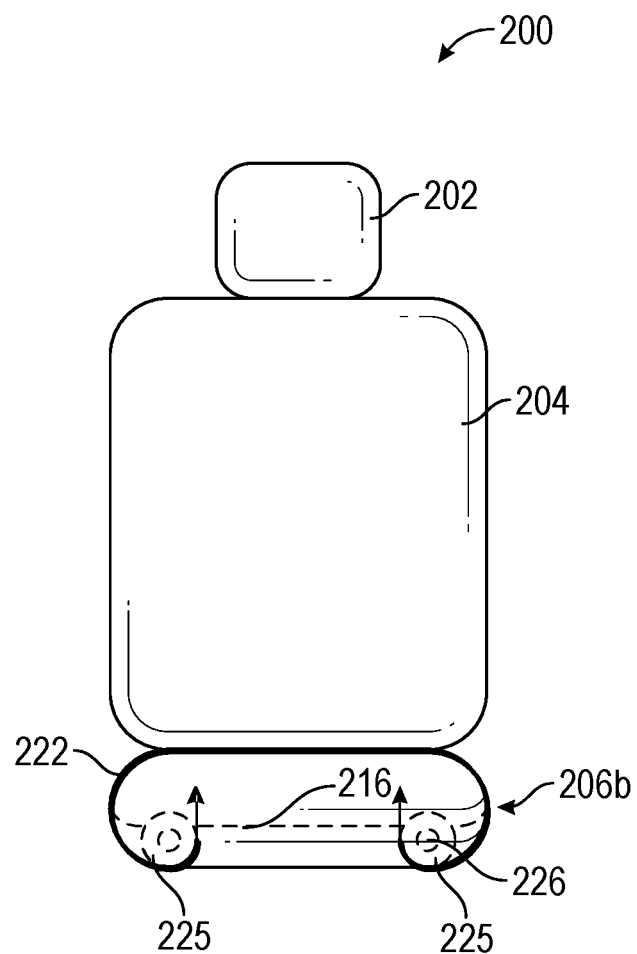
FIG. 4 is a front pictorial view of a seat equipped with an adaptive tensile control system that includes a motorized retractor, according to some embodiments of the present disclosure as described herein.
Figure 6:
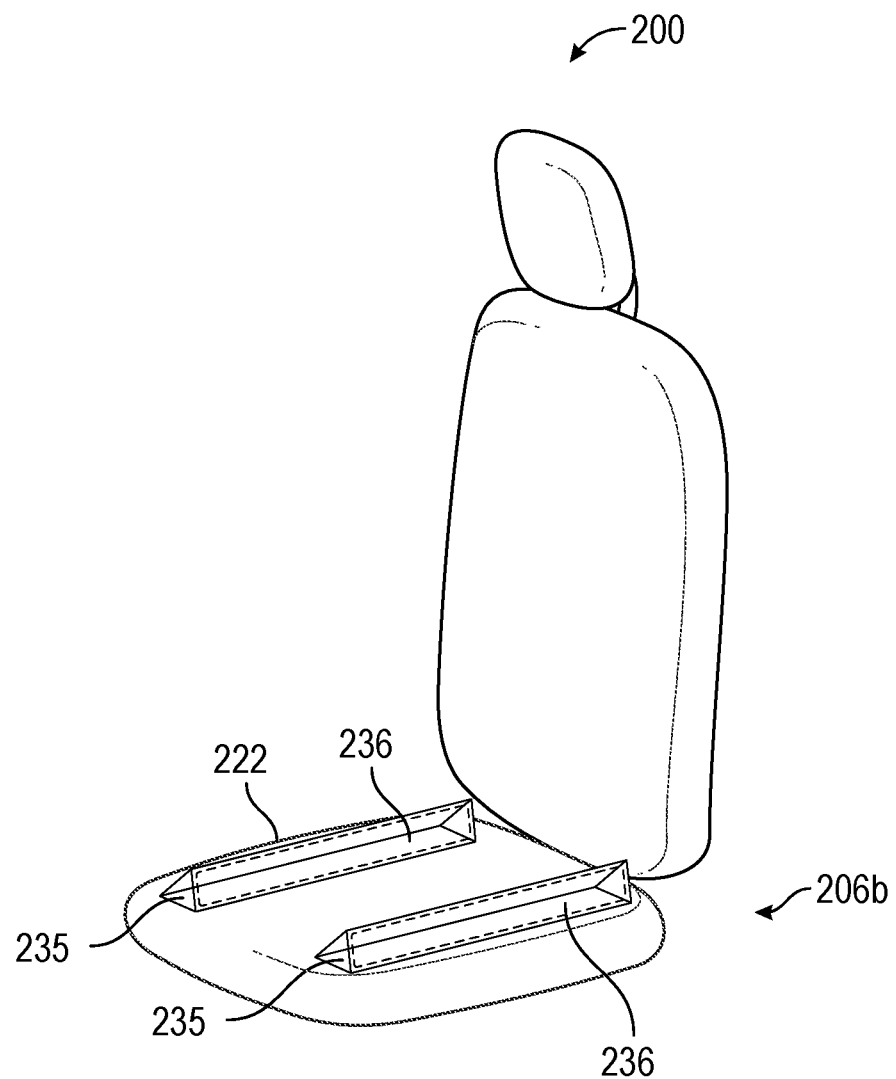
FIG. 6 is a pictorial view of a seat equipped with inflatable bolsters, according to some embodiments of the present disclosure as described herein.

FIGS. 4 and 6 illustrate the vehicle seat assembly 200, equipped with a dynamic seat 206*b* and an adaptive tensile control system 224, according to some embodiments of the present disclosure. The covering 222 on the dynamic seat 206*b* has a dynamic surface capable of changing to conform to variations in the dynamic seat 206*b*, such as changes in the surface contours of the dynamic seat 206*b*. In some examples, surface contours passively change as occupants enter or leave the vehicle, or as the occupants move relative to the seat. In some examples, surface contours are actively altered (e.g., as occupants enter or leave the vehicle). The covering 222 covers at least a portion of the dynamic seat 206*b*. For example, the covering 222 covers the upper portion 212 of the dynamic seat 206*b* and extends at least partially around the lower portion 210. In some examples, the covering 222 is made of one or more of a polymer, a textile, an animal skin (e.g., leather), rubber, and combinations thereof.

Figure 5:
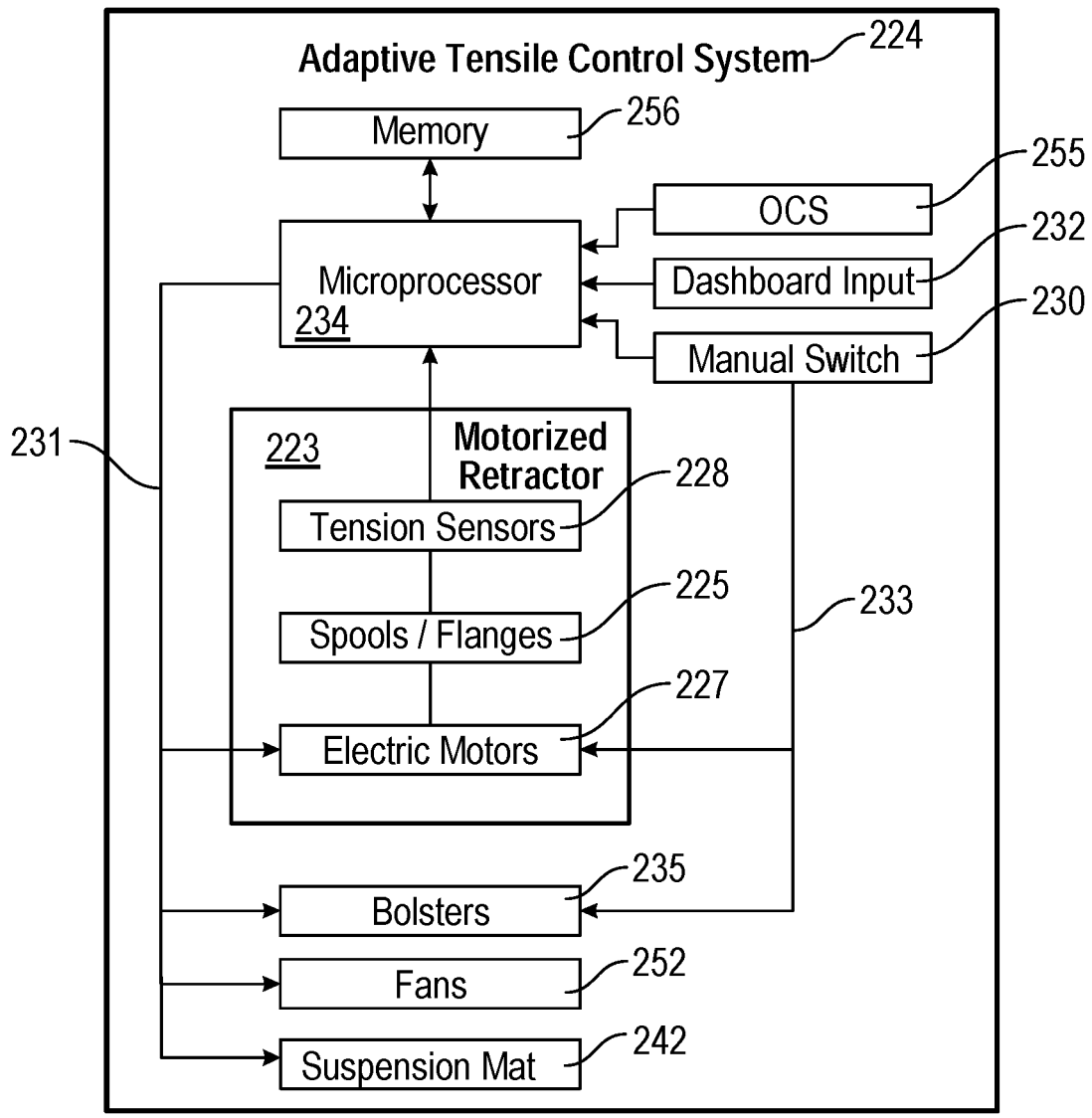
FIG. 5 is a block diagram of an adaptive tensile control system, according to some embodiments of the present disclosure as described herein.

In some examples, the adaptive tensile control system 224, shown in FIG. 5, is an electronic feedback control system in which a motorized retractor 223 is activated to vary tension on the covering 222. The motorized retractor 223 is located underneath or the dynamic seat 206*b* and/or is a part of the dynamic seat 206*b*. Optionally, the motorized retractor 223 is hidden by the dynamic seat 206*b*. The motorized retractor 223 includes one or more spools 225 having spindles 226, electric motors 227, and optional tension sensors 228 (e.g., strain gauges). In some examples, the motorized retractor 223 is further equipped with a holding mechanism that relieves or reduces the electric motors 227 of the tensile load.

In some examples, the electric motors 227 are activated in response to a control signal 231 based on one or more inputs to a microprocessor 234. Inputs to the microprocessor 324 include, for example, the tension sensors 228, a manual switch 230, and an electronic control panel setting such as, for example, a dashboard input 232. The microprocessor 234 is programmed to process the inputs and to issue the control signal 231 to the motorized retractor 223. Additionally or alternatively, the electric motors 227 are activated directly by a separate control signal 233 received directly from the manual switch 230 (e.g., a pushbutton or a control panel associated with the seat assembly 200).

The adaptive tensile control system 224 and associated features are suitable for use in various types of seats, and are not limited to vehicle seats. For example, when the adaptive tensile control system 224 is implemented without a dashboard control input, the adaptive tensile control system 224 is suitable for use in ergonomic chairs, such as desk chairs.

Returning to FIG. 4, ends of the covering 222 are coupled to the electric motors 227 by the spools 225. For example, opposite ends of the covering 222 are wound around respective spools 225. The respective spools 225 are configured to rotate around the spindles 226 to wind or unwind the covering 222 around respective spools 225, as needed. In some examples, the one or more spools 225 rotating to wind the covering 222 around the respective spools tightens the covering 222. In some examples, the one or more spools 225 unwinding the covering 222 from the respective spools loosens the covering 222. Such adjustments in tension of the covering 222 help prevent visual material strain of the covering 222. In some examples, the covering includes one or more of elastic panels, sheer panels, and adhesives applied to selected portions of the trim material. In some examples, some areas of the trim material are kept under tension while in other areas, tension of the covering 222 is controlled by the adaptive tensile control system.

In some examples, the surface geometry of the dynamic seat 206*b* changes, such as described in additional detail with reference to FIG. 6. For example, the size, shape, height, width, or existence of one or more supports within the dynamic seat 206*b* changes, thereby changing the surface geometry of the dynamic seat 206*b*. The covering 222 adapts to accommodate the changes in the surface geometry of the dynamic seat 206*b*.

Figure 12:
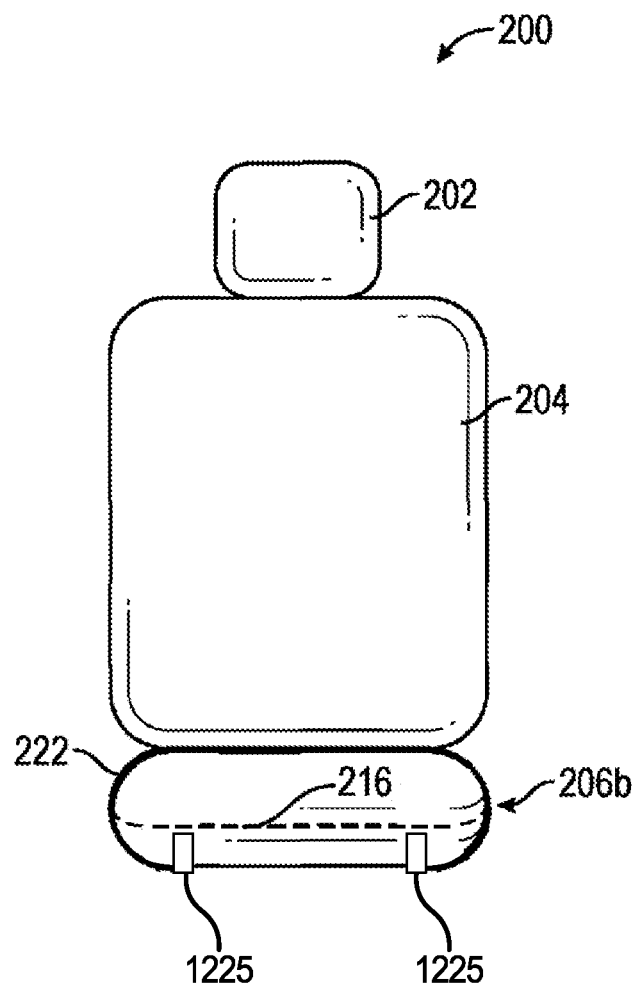
FIG. 12 is a front pictorial view of a seat equipped with an adaptive tensile control system that includes flanges, according to some embodiments of the present disclosure as described herein.

FIG. 4 provides an illustrative example of the adaptive tensile control system 224 for adjusting the tension of the covering 222 and providing for variation in the covering 222 as the surface geometry of the dynamic seat 206*b* changes shape. In some embodiments, tension of the covering 222 is adjusted in response to stretching due to changes in the weight or position of an occupant of the seat 206*c*, or in response to ingress and egress of the occupant. To accomplish this adjustment, rotation of the spools 225 is driven by the electric motors 227. In some embodiments, both spools 225 are rotated (e.g., concurrently) in the same or opposite directions to retract and take up slack in the covering 222. The spools 225 are counter-rotated (e.g., concurrently) in the same or opposite directions to release the covering 222, providing slack. The directions of rotation of the spools needed for retracting or releasing the covering 222 depend on how the covering 222 is wound onto the spools 225. In the example illustrated in FIG. 4, the spools 225 rotate in opposite directions to release covering 222 and counter-rotate in opposite directions to retract covering 222. In some embodiments, one of the spools 225 remains fixed while the other spool rotates to either release or retract the covering 222. In some embodiments, a first end of the covering 222 is a fixed end 1125 as shown in FIG. 112 and a second end of the covering 222 is coupled to one or more electric motors. In some examples, because tension on the covering 222 is transferred to the spools 225, the tension sensors 228 are attached to, or integral with, the spools 225 to monitor spool tension and provide feedback for automatically adjusting the covering. In some examples, as the covering 222 tightens around the spool 225, the tension sensor 228 detects an increase in spool tension, and as the covering 222 loosens around the spool 225, the tension sensor 228 detects a decrease in spool tension. In some embodiments, the spools 225 are replaced by flanges 1225 as shown in FIG. 12, which are connected to a linear actuator (e.g., an electronic linear actuator) to extend and retract the covering 222 in a linear translational motion instead of a rotational motion. When flanges 1225 are used in place of the spools 225, the tension sensors 228 are optionally attached to the flanges 1225 to sense tension on the covering 222.

FIG. 6 shows the underlying contours of the dynamic seat 206b. In some embodiments, the dynamic seat 206b includes supports of variable size, such as dynamic bolsters 235.

In some embodiments, the dynamic bolsters include inflatable chambers 236, which cause changes in the shapes of the dynamic bolsters 235, resulting in a complex curvature for the dynamic seat 206b. The covering 222 covers the dynamic bolsters 235 and is in at least partial contact with the dynamic bolsters 235. In some examples, the inflatable chambers 236 are inflated using ambient air. In some examples, the inflatable chambers 236 are coupled to a reservoir located behind or under the seat 206b. The reservoir supplies a filler with which to inflate the chambers 236. Such fillers include one or more of a gas, a fluid, a liquid, an aerosol, or a gel, for example. The filler is supplied via a valve (e.g., a pneumatic valve) coupling the reservoir to the inflatable chamber 236. In some examples, the dynamic bolsters 235 are provided in a range of sizes and shapes and are adjustable to a range of sizes and shapes. In some examples, a single inflatable chamber 236 is used to create a bolster. In other examples, a plurality of inflatable chambers 236 are used to create a bolster. Dynamic bolsters 235 formed of inflatable chambers 236, such as those shown in FIG. 6, are used, for example, as side supports on an individual seat, or as dividers on a bench seat. Additionally or alternatively, in some examples, the dynamic bolsters 235 are pushed into place and retracted pneumatically to form moveable dividers, with or without using inflatable chambers 236. Such dynamic bolsters 235 are suitable, for example, to reconfigure a bench seat to stabilize lateral passenger motion and thus securely separate multiple passengers from sliding toward one another when the vehicle makes a sharp turn. In some examples, dynamic bolsters 235 divide a bench seat into three sections to accommodate three occupants. In some examples, different bolsters are activated to reconfigure the bench seat into two larger sections to accommodate two occupants. When the dynamic bolsters 235 are no longer needed, the bolsters are retracted, causing the contour of the dynamic seat 206b to revert to a substantially flat seat.

When the surface geometry of the dynamic seat 206b changes from substantially flat (e.g., with non-inflated bolsters) to non-flat (e.g., with inflated bolsters), the adaptive tensile control system 224 releases the covering 222 to accommodate the change in the surface geometry. In some examples, the amount of covering 222 released is based on the amount of change in the surface geometry of the dynamic seat 206b or is based on the surface area (or change in surface area) of the dynamic seat 206b. In some examples, when the surface geometry of the dynamic seat 206b changes from non-flat (e.g., with inflated bolsters) to substantially flat (e.g., with non-inflated bolsters), the adaptive tensile control system 224 retracts the covering 222 to accommodate the change in the surface geometry. In some examples, the amount of covering 222 retracted is based on the amount of change in the surface geometry of the dynamic seat 206b or is based on the surface area (or change in surface area) of the dynamic seat 206b. In some examples, the seat assembly 200 is configured such that a first portion of the covering (e.g., a central portion) is prevented from slipping across the surface of the seat 206b. In one example, slip is prevented by adhering the first portion of the covering 222 to the seat. In some examples, the seat assembly 200 is configured such that one or more additional portions of the covering 222, different from the first portion, are operable to slip with respect to the seat. For example, the one or more additional portions of the covering 222 are not adhered to the seat. In some examples, the first portion of the covering 222 covers a center portion of the seat, extending from the back-center of the seat to the front-center of the seat. In some examples, the one or more additional portions of the covering 222 cover the left portion of the seat and the right portion of the seat, each extending from the back-left to the front-left of the seat and from the back-right to the front-right of the seat, respectively. For example, the left portion of the covering 222 covers a respective first dynamic bolster 235 and the right portion of the covering 222 covers a second respective dynamic bolster 235. As dimensions of the dynamic bolsters 235 change, the adaptive tensile control system 224 adjusts the covering 222 accordingly. In some examples, the first portion of the covering 222 remains static as the adaptive tensile control system 224 adjusts the covering 222 to accommodate the bolsters and the one or more additional portions of the covering 222 slip as additional covering is released or retracted to accommodate the dynamic bolsters 235.

In some embodiments, changing the surface geometry of the dynamic seat 206b and adjusting tension of the covering 222 (e.g., which is in contact with the dynamic bolsters 235) are coordinated actions. For example, inflation of the dynamic bolsters 235 is pneumatically controlled in accordance with the dashboard input 232 or the manual switch 230. That is, inflation of the chambers 236 is controlled by a switch, possibly the same switch, such as the manual switch 230 or the dashboard input 232 that controls activation of the motorized retractor 223. Additionally or alternatively, the tension sensor 228 or another type of sensor in the seat (e.g., a pressure sensor that senses one or more occupants) is configured to trigger inflation of one or more dynamic bolsters 235. At the same time, the sensor triggers the adaptive tensile control system 224 to adjust the covering 222 accordingly, such as by releasing or retracting the covering 222 to accommodate the change in the dynamic bolsters 235. Releasing and retracting the covering 222 as the dynamic seat 206b changes shape improves both the appearance and the comfort of the dynamic seat 206b while helping to prevent visual material strain of the covering 222.

Figure 7:
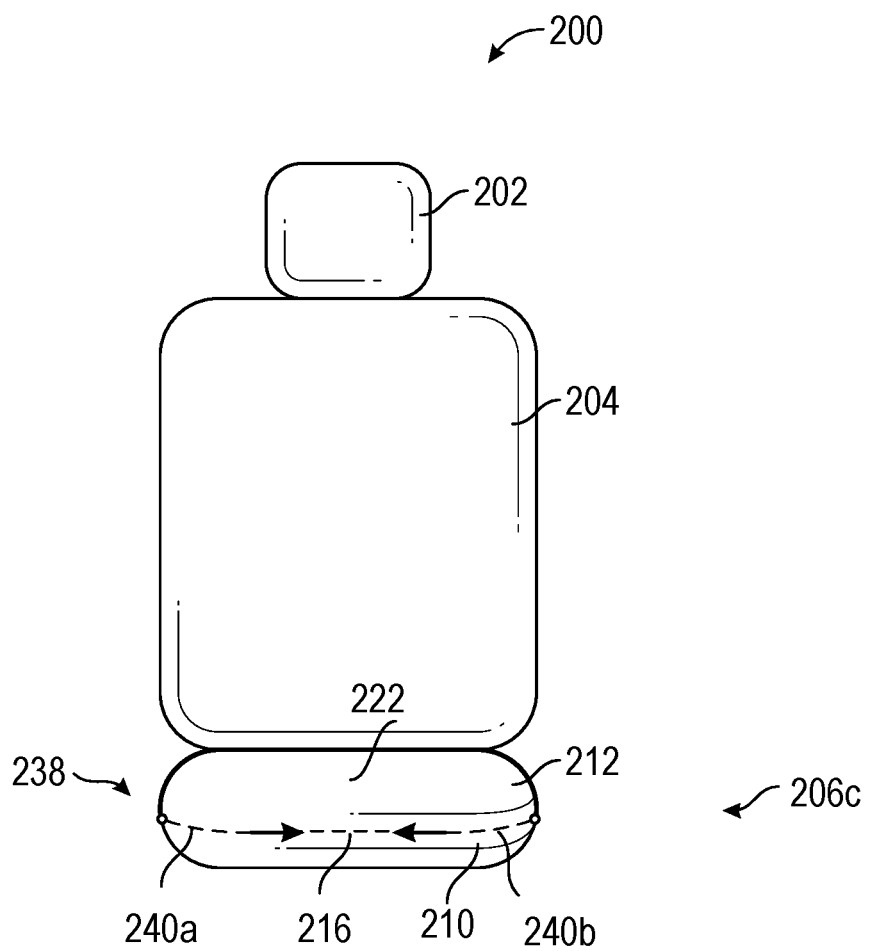
FIG. 7 is a front pictorial view of a seat equipped with an elasticized covering, according to some embodiments of the present disclosure as described herein.

FIG. 7 illustrates a vehicle seat assembly 200 having a dynamic seat 206c that includes an elasticized covering 238. The elasticized covering 238 includes one or more elastic panels 240a and 240b. In some examples, the elasticized covering 238 fits tightly around the dynamic seat 206c, gripping the dynamic seat 206c. In some examples, the elasticized covering 238 covers the top of dynamic seat 206c, extends below the midline, and is anchored to the underside of the dynamic seat 206c. In some examples, the elasticized covering 238 provides a seamless geometric surface, rather than using individual trim pieces that are sewn together. In some examples, the elasticized covering 238 includes one or more of elastic panels, sheer panels, and adhesives applied to selected portions of the trim material.

In some embodiments, portions of the elasticized covering 238 are adjusted by the adaptive tensile control system 224. In some embodiments, portions of the elasticized covering 238 accumulate underneath the dynamic seat 206c when not needed, and expand elastically when needed. Using elasticized covering 238, portions of the trim are kept under tension while allowing for some degree of surface deflection. In some examples, an area of the covering 238 located between two bolsters (e.g., dynamic bolsters 235) is secured to the dynamic seat 206c by an adhesive.

In some embodiments, the elasticized covering 238 includes the covering 222 augmented with one or more elastic panels 240. In some examples, the covering 222 extends below the midline 216 and includes a left end and a right end, which are opposite ends of the covering 222 from each other and are below the midline 216. A first end of a first elastic panel 240a is attached to the left end of the covering 222 and a first end of a second elastic panel 240b is attached to the right end of the covering 222. A second end of the first elastic panel 240a and a second end of the second elastic panel 240a are attached (e.g., anchored) to the seat assembly 200, such as at locations on the underside of the seat 206c. In some examples, the covering 222 exhibits a first degree of elasticity and the one or more elastic panels 240a, 240b exhibit a second degree of elasticity that is greater than the first degree of elasticity (e.g., the elastic panels are more easily stretched than the covering 222). In some examples, a material of the covering 222 is less elastic than a material of the elastic panels 240a, 240b. For example, the covering 222 is made primarily of leather and the elastic panels 240a, 240b are made primarily of 2-way stretch fabric that is configured to stretch in the direction between the first and second ends of the elastic panels. In some examples, the covering 222 covers the seat 206c, including any bolsters of the seat. The elastic panels 240a, 240b allow at least portions of the covering 222 to slip across the surface of the seat 206c, such as to accommodate changes in the surface geometry of the dynamic seat 206c.

In some examples, the surface geometry of the dynamic seat 206c changes, such as described in additional detail with reference to FIG. 6. For example, the size, shape, height, width, or existence of one or more bolsters 235 change, thereby changing the surface geometry of the dynamic seat 206c. The elasticized covering 238 adapts to accommodate the changes in the surface geometry of the dynamic seat 206c. For example, when the surface geometry of the dynamic seat 206c changes from substantially flat (e.g., without bolsters 235, or with non-inflated bolsters 235) to non-flat (e.g., with bolsters 235, or with inflated bolsters 235), the elastic panels 240a, 240b stretch to release the covering 222 to accommodate the change in the surface geometry. In some examples, the amount of covering 222 released is based on the amount of change in the surface geometry of the dynamic seat 206c, is based on the surface area (or change in surface area) of the dynamic seat 206c, and/or is based on the elasticity of the elastic panels 240a, 240b. For another example, when the surface geometry of the dynamic seat 206c changes from non-flat (e.g., with bolsters 235, such as inflated bolsters 235) to substantially flat (e.g., without bolsters 235, or with non-inflated bolsters 235), the elastic panels 240a, 240b contract to retract the covering 222 to accommodate the change in the surface geometry. In some examples, the amount of covering 222 retracted is based on the amount of change in the surface geometry of the dynamic seat 206c, the surface area (or change in surface area) of the dynamic seat 206c, and/or the on the elasticity of the elastic panels 240a, 240b.

In some examples, the seat assembly 200 is configured such that a first portion of the covering is prevented from slipping across the surface of the seat 206c. For example, the first portion of the covering 222 is adhered to the seat. In some examples, the seat assembly 200 is configured such that one or more additional portions of the covering 222, different from the first portion, are operable to slip with respect to the seat. For example, the one or more additional portions of the covering 222 are not adhered to the seat. In some examples, the first portion of the covering 222 covers a center portion of the seat, extending from the back-center of the seat to the front-center of the seat. In some examples, the one or more additional portions of the covering 222 cover the left portion of the seat and the right portion of the seat, each extending from the back-left to the front-left of the seat and from the back-right to the front-right of the seat, respectively. For example, the left portion of the covering 222 covers a respective first dynamic bolster (e.g., 235) and includes the left end of the covering 222, and the right portion of the covering 222 covers a second respective dynamic bolster (e.g., 235) and includes the right end of the covering 222. As the dimensions of the bolsters 235 change, the one or more sheets of elastic 240a, 240b adjust the covering 222 to accommodate the bolsters. In some examples, the first portion of the covering 222 remains static and the one or more additional portions of the covering 222 slip as additional covering is released or retracted to accommodate the changing bolsters. In some examples, an area of covering 222 located between two dynamic bolsters is secured to the seat, such as by an adhesive.

Figure 8:
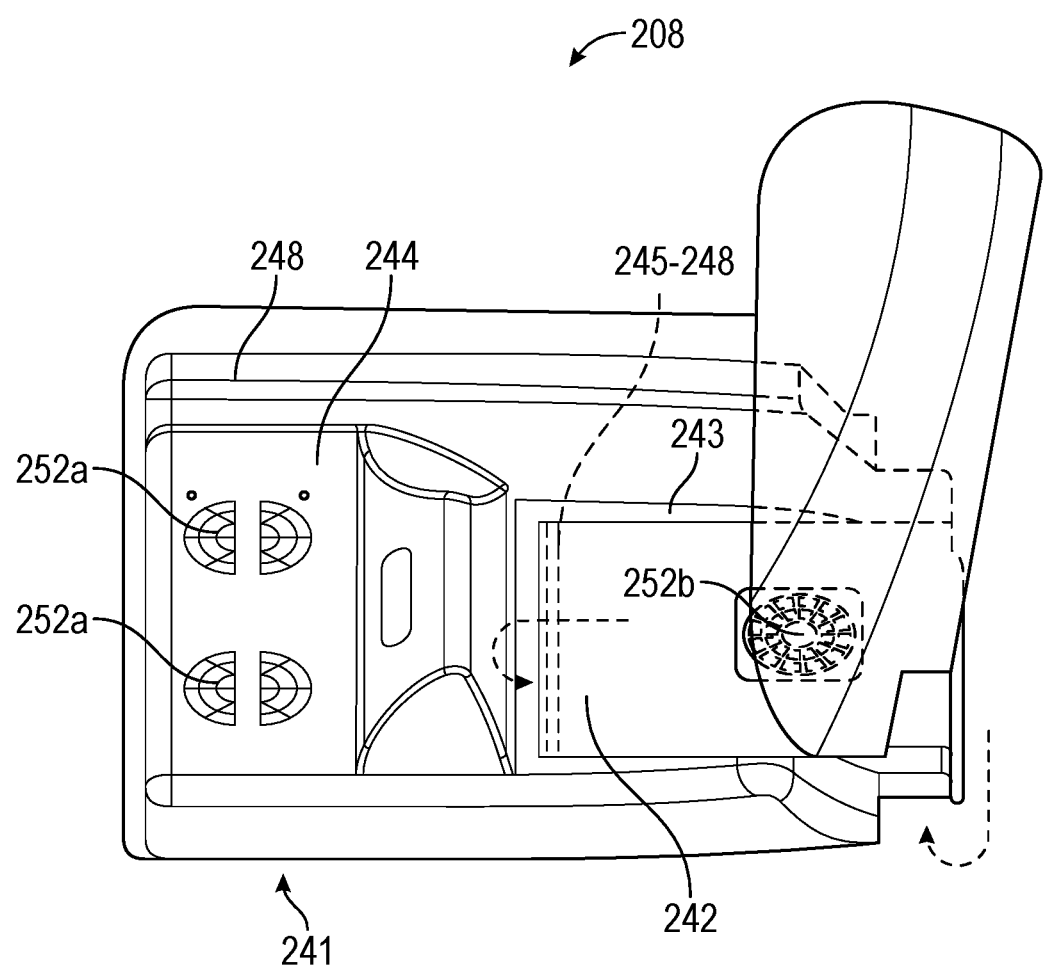
FIG. 8 is a pictorial top plan view of a seat equipped with an adaptive suspension system, according to some embodiments of the present disclosure as described herein.

FIG. 8 shows details of an exemplary active suspension 208 that optionally provides occupant support as part of the vehicle seat 206, according to some embodiments of the present disclosure. For example, the active suspension 208 provides varying degrees of support for an occupant of the seat 206. In some embodiments, the active suspension 208 is contained within the seat 206. In some embodiments, the active suspension 208 is equipped with one or more motorized retractors 223. The one or more motorized retractors 223 are used in tensioning the active suspension 208 within the seat 206. In some examples, the seat assembly 200 is equipped with both the active suspension 208 and the dynamic seat 206b, under control of the adaptive tensile control system 224. FIG. 8 also illustrates a portion of seatback 204.

In some examples, the active suspension 208 includes an undercarriage 241 having a cutout 243, and a flexible suspension mat 242 mounted over the cutout 243 so that the flexible suspension mat 242 is permitted to deflect in a transverse direction relative to the plane of the undercarriage 241. The plane of the undercarriage 241 is optionally tilted, but is generally horizontal, while movement of the flexible suspension mat 242 includes a vertical component. The amount of deflection of the flexible suspension mat 242 is determined (e.g., in part) by a spring constant, or k-value, that characterizes stiffness of the flexible suspension mat 242. By altering the stiffness of the flexible suspension mat 242, the active suspension 208 provides a variable spring mat that accommodates occupants of different weights and statures, instead of a typical static suspension that is designed for a particular occupant classification. For example, the flexible suspension mat 242 raises and/or lowers seat occupants by changing the allowable deflection.

In some examples, the flexible suspension mat 242 is anchored by front and back spools 245 mounted on spindles 246. In some examples, tension of the flexible suspension mat is altered by rotating the spools (e.g., wrapping portions of the flexible suspension mat 242 around the spools). In some examples, rotating the spools causes the flexible suspension mat 242 to translate (e.g., forward or backward), such as in a treadmill fashion. In some examples, the flexible suspension mat 242 is made of, for example, a mesh, e.g., a nylon mesh, metal mesh, or other flexible fabric made of strong fibers.

The undercarriage 241 is made of metal, high-impact plastic, fiberglass, carbon fiber, or a similar material that is strong and, for example, is castable or moldable. In some examples, additional cutouts in the undercarriage 241 provide for one or more fan vents 252a. In some examples, the flexible suspension mat 242 includes a comfort element such as fan 252b, a blower, a heating element, or the like. In the example shown in FIG. 8, the comfort element (e.g., fan 252b) is integrated into the flexible suspension mat 242. The comfort element provides a comfort function for the occupant of the seat, such as air to heat or cool the occupant. When the flexible suspension mat 242 includes an integrated comfort element, translation of the flexible suspension mat 242 causes a corresponding translation of the comfort element (e.g., towards the front or back of the seat 206). Additional details regarding tension adjustment of the flexible suspension mat and integrated comfort elements are described in further detail, with reference to FIGS. 9 and 10.

Figure 9:
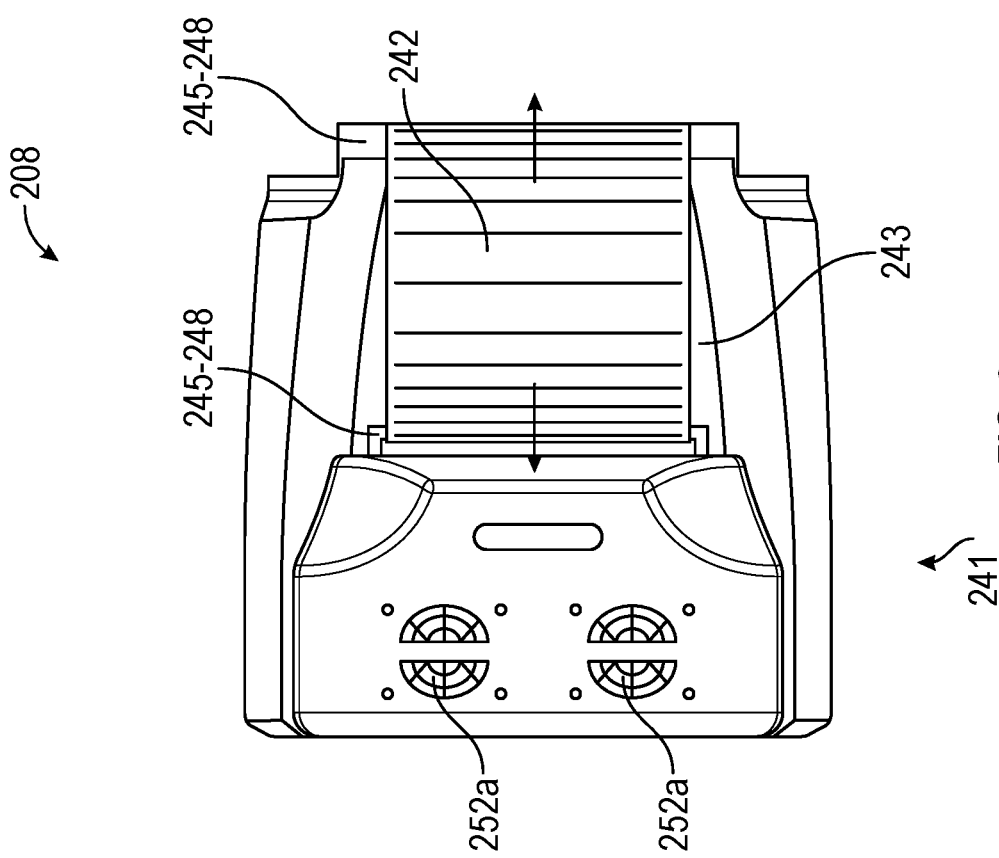
FIG. 9 is a pictorial top plan view of a seat equipped with an adaptive suspension system that adjusts tension of a flexible suspension mat, according to some embodiments of the present disclosure as described herein.
Figure 11:
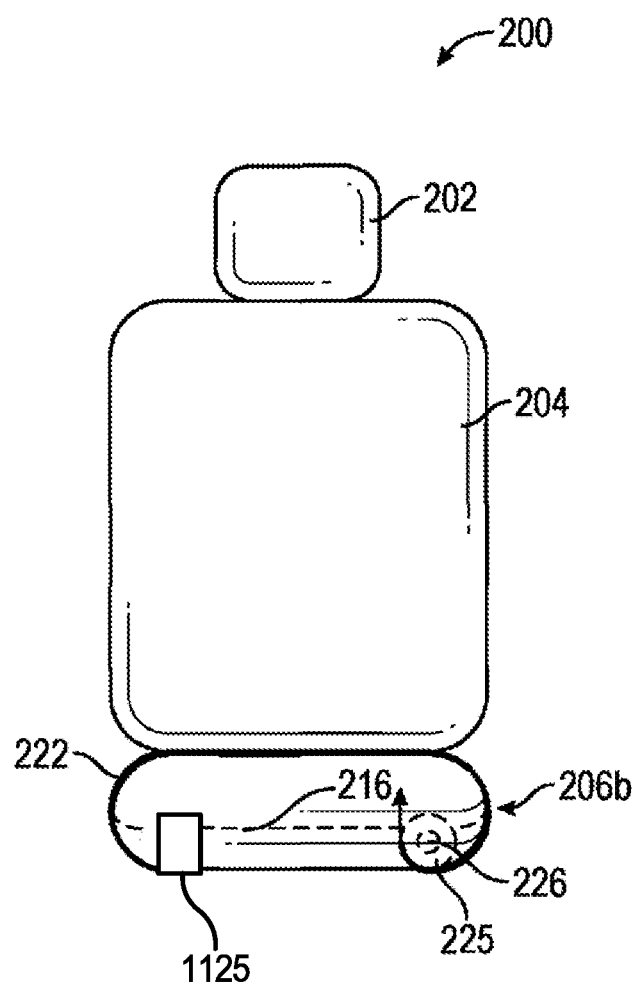
FIG. 11 is a front pictorial view of a seat equipped with an adaptive tensile control system that includes a fixed end, according to some embodiments of the present disclosure as described herein.

FIG. 9 shows the active suspension 208, including the flexible suspension mat 242, according to some embodiments of the present disclosure. In some examples, by tightening the flexible suspension mat 242, the top of seat 206, including the covering 222, and the occupant are raised up. In some examples, by loosening the flexible suspension mat 242, the top of seat 206, including the covering 222, and the occupant are lowered. As illustrated in FIG. 9 by the arrows on the flexible suspension mat 242, tension of the flexible suspension mat 242 is adjustable to a particular tension setting by rotating the spools 245 (e.g., in opposite directions), using electric motors 247 and, optionally, tension sensors 248, similar to the electric motors 227 and tension sensors 228 described above for adjusting the trim material 222.

In some examples, tension settings for adjusting the flexible suspension mat 242 are manually selectable by a user via a pushbutton or a control panel setting associated with the seat assembly 200. In some examples, the tension is automatically adjusted in response to changes in the weight or position of an occupant of the seat 206, or in response to ingress and egress of the occupant. In some examples, the tension is automatically adjusted to a preference of an occupant in response to detecting ingress of the occupant.

In some embodiments, the tension setting is linked to a smart occupant classification system (OCS) 255 for automatic adjustment based on attributes of the occupant. The OCS 255 detects (e.g., by measuring) one or more attributes (e.g., size, weight, height) of an occupant of the seat, and transmits the data and/or a classification of the occupant based on the attributes, to the microprocessor 234 for storage in the electronic memory 256. In some embodiments, presence of the occupant in the seat is detected by a pressure sensor in the seat (and/or, optionally, by a buckle sensor in a seat belt buckle); weight of the occupant is measured by a weight sensor in the seat; and size of the occupant is computed from a measurement of a length of seat belt webbing that is spooled out from a seat belt tensioner. In response to the information received from the OCS 255, the microprocessor 234 is programmed to transmit the control signal 231 that activates the electric motors 247. Thus, the tension and/or translation of the flexible suspension mat 242 is adjusted based on attributes of the occupant.

Figure 10:
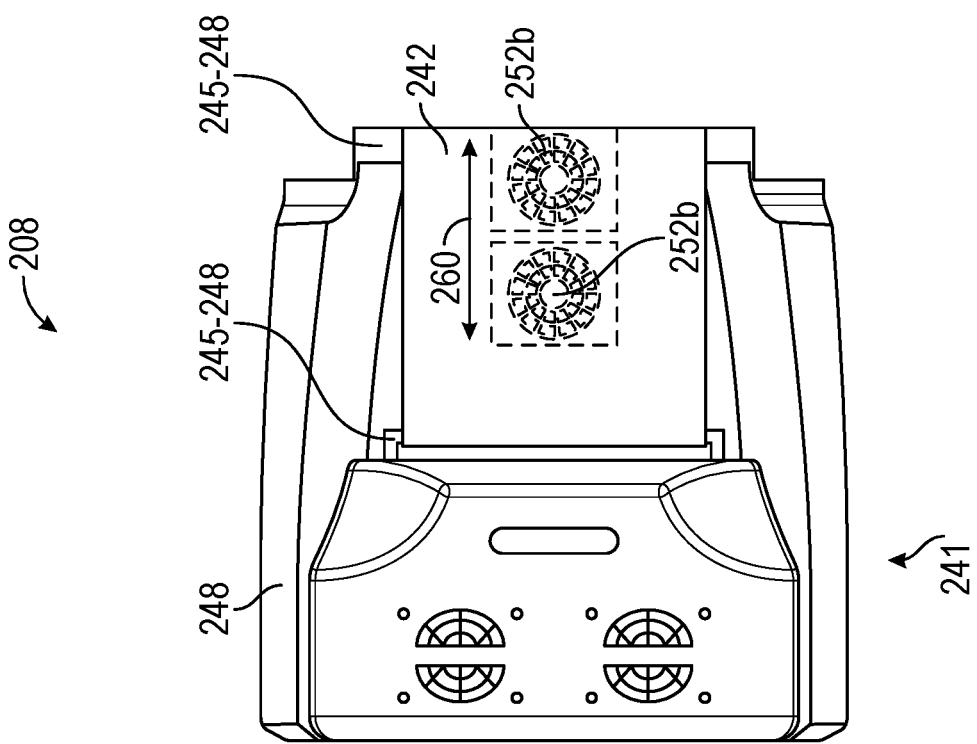
FIG. 10 is a pictorial top plan view of a seat suspension equipped with an adaptive thermal control, according to some embodiments of the present disclosure as described herein.

FIG. 10 shows the flexible suspension mat 242 having an integrated comfort element (e.g., fan 252b), according to some embodiments of the present disclosure. In some examples, operation of the fan 252b (e.g., on/off and speed) is controlled by an ambient temperature sensor according to a temperature set point stored in the memory 256 or provided by a dashboard input 232. The ambient temperature sensor is configured to transmit a control signal to activate the fan 252b whenever an ambient temperature value deviates from a temperature setting by a selected amount. Additionally or alternatively, a manual switch 230 is configured to control operation of the fan 252b.

FIG. 10 illustrates two positions of the fan 252b. In some examples, the fan 252b is integral with the flexible suspension mat 242 so that translating the flexible suspension mat 242 forward and backward changes the position of fan 252b. In some examples, the flexible suspension mat 242 is translated to a position selected from a plurality of predetermined positions. In some examples, the flexible suspension mat 242 is translated to position the fan 252b based on the position of the occupant. The occupant's position is sensed by, for example, a pressure sensor located in the seat 206 or in the active suspension 208. In some examples, the flexible suspension mat 242 automatically translates in response to, for example, a shift in forward/aft position of the occupant on the seat 206. As the flexible suspension mat 242 translates, a position of the fan 252b also translates (e.g., to move forward or backward). In some examples, when the occupant slides backward in the seat 206, the flexible suspension mat 242 translates toward the rear of the seat 206, thus positioning the fan 252b to blow air upward through a rear area of the covering (e.g., mesh fabric). Translation of the flexible suspension mat 242 is accomplished by rotating the spools 245 in, for example, the same direction. For example, the fan 252b is repositioned, as indicated by arrows 260, by releasing the flexible suspension mat 242 from a first spool and retracting the flexible suspension mat 242 at a second spool. In some examples, the first spool releases the flexible suspension mat 242 concurrently with the second spool retracting the flexible suspension mat 242. Likewise, when the occupant shifts toward the front of the seat 206, the suspension mat translates the fan 252b forward to force air through the front portion of the covering (e.g., mesh fabric). For example, the fan 252b is repositioned, as indicated by the arrows 260 by retracting the flexible suspension mat 242 from the first spool and releasing the flexible suspension mat 242 at the second spool. In some examples, the first spool retracts the flexible suspension mat 242 concurrently with the second spool releasing the flexible suspension mat 242. In some examples, the fan 252b is suitable for cooling the seat 206 or, with the addition of a heating element, for heating the seat 206.

The foregoing description, for purpose of explanation, has been made with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. An adaptive tensile control system, comprising:
a covering over at least a portion of a seat; and
a motorized retractor coupled to the covering, the motorized retractor including an electric motor that is operable to adjust tension applied to the covering; and
a control system that receives a tension input that represents tension applied to the covering and controls the motorized retractor to control the adjustment of tension applied to the covering according to the tension input.

2. The system of claim 1, wherein a first end of the covering is fixed and a second end of the covering is coupled to the electric motor.

3. The system of claim 1, wherein the electric motor is a first electric motor, a first end of the covering is coupled to the first electric motor, and a second end of the covering is coupled to a second electric motor.

4. The system of claim 3, wherein the first and second ends of the covering are coupled to the first and second electric motors via spools, and the first and second electric motors are operable to rotate the spools based on control signals from the control system.

5. The system of claim 1, wherein the covering includes one or more of a polymer, a textile, an animal skin, rubber, and combinations thereof.

6. The system of claim 1, wherein the covering is in at least partial contact with a bolster of the seat, the bolster having a variable size.

7. The system of claim 6, wherein the bolster includes an inflatable chamber.

8. The system of claim 1, wherein the seat is part of a chair.

9. The system of claim 1, wherein the seat is part of a vehicle.

10. An adaptive tensile control system, comprising:
a covering over at least a portion of a seat; and
a motorized retractor coupled to the covering, the motorized retractor including electric motors operable to:
release the covering in response to a first control signal, and
retract the covering in response to a second control signal, different from the first control signal,
wherein opposite ends of the covering are coupled to corresponding ones of the electric motors, and
wherein the opposite ends of the covering are coupled to the electric motors via flanges, and the electric motors are operable to linearly translate the flanges based on the first and second control signals.

11. The system of claim 10, wherein the covering includes one or more of a polymer, a textile, an animal skin, rubber, and combinations thereof.

12. The system of claim 10, wherein the covering is in at least partial contact with a bolster of the seat, the bolster having a variable size.

13. The system of claim 12, wherein the bolster includes an inflatable chamber.

14. The system of claim 10, further comprising a tension sensor.

15. An adaptive tensile control system, comprising:
a covering over at least a portion of a seat;
a motorized retractor coupled to the covering, the motorized retractor including an electric motor operable to:
release the covering in response to a first control signal, and
retract the covering in response to a second control signal, different from the first control signal; and
a tension sensor.

16. The system of claim 15, further comprising a microprocessor programmed to receive input signals from the tension sensor and to provide the control signals to the electric motor.

17. The system of claim 16, wherein the input signals further include a signal received as a dashboard input.

18. The system of claim 15, wherein a first end of the covering is fixed and a second end of the covering is coupled to the electric motor.

19. The system of claim 15, wherein the electric motor is a first electric motor, a first end of the covering is coupled to the first electric motor, and a second end of the covering is coupled to a second electric motor.

20. The system of claim 19, wherein the first and second ends of the covering are coupled to the first and second electric motors via spools, and the first and second electric motors are operable to rotate the spools based on control signals from the control system.

* * * * *